United States Patent [19]

Strand

[11] Patent Number: 5,785,848

[45] Date of Patent: Jul. 28, 1998

[54] RECTANGULAR BODY WATER PURIFICATION DEVICE

[76] Inventor: Charles D. Strand, 8811 Royal Harbor Ct., Fort Worth, Tex. 76179

[21] Appl. No.: 761,219

[22] Filed: Dec. 6, 1996

[51] Int. Cl.$^6$ ........................................... C02F 9/00
[52] U.S. Cl. ........................... 210/282; 210/283; 210/286
[58] Field of Search ............................ 210/282, 283, 210/284, 286, 287

[56] References Cited

U.S. PATENT DOCUMENTS

| | | | |
|---|---|---|---|
| 1,432,351 | 10/1922 | McGahan | 210/284 |
| 4,196,081 | 4/1980 | Pavia | 210/284 |
| 5,041,219 | 8/1991 | Strand et al. | 210/284 |
| 5,320,752 | 6/1994 | Clack et al. | 210/282 |
| 5,340,478 | 8/1994 | Strand et al. | 210/284 |

*Primary Examiner*—Ivars Cintins
*Attorney, Agent, or Firm*—Daniel V. Thompson

[57] ABSTRACT

A liquid filter includes a housing in the form of a elongated, substantially rectangular body. The body has two end walls, top and bottom walls and two side walls. The body has length, height and thickness dimensions. At least one vertical partition is located in the housing, diving the housing into at least two chambers having bottoms. Filtration particulate is located in the chambers. An inlet and outlet are provided as well as a port in the partition for causing liquid flowing through the chambers to pass between adjacent chambers.

1 Claim, 2 Drawing Sheets

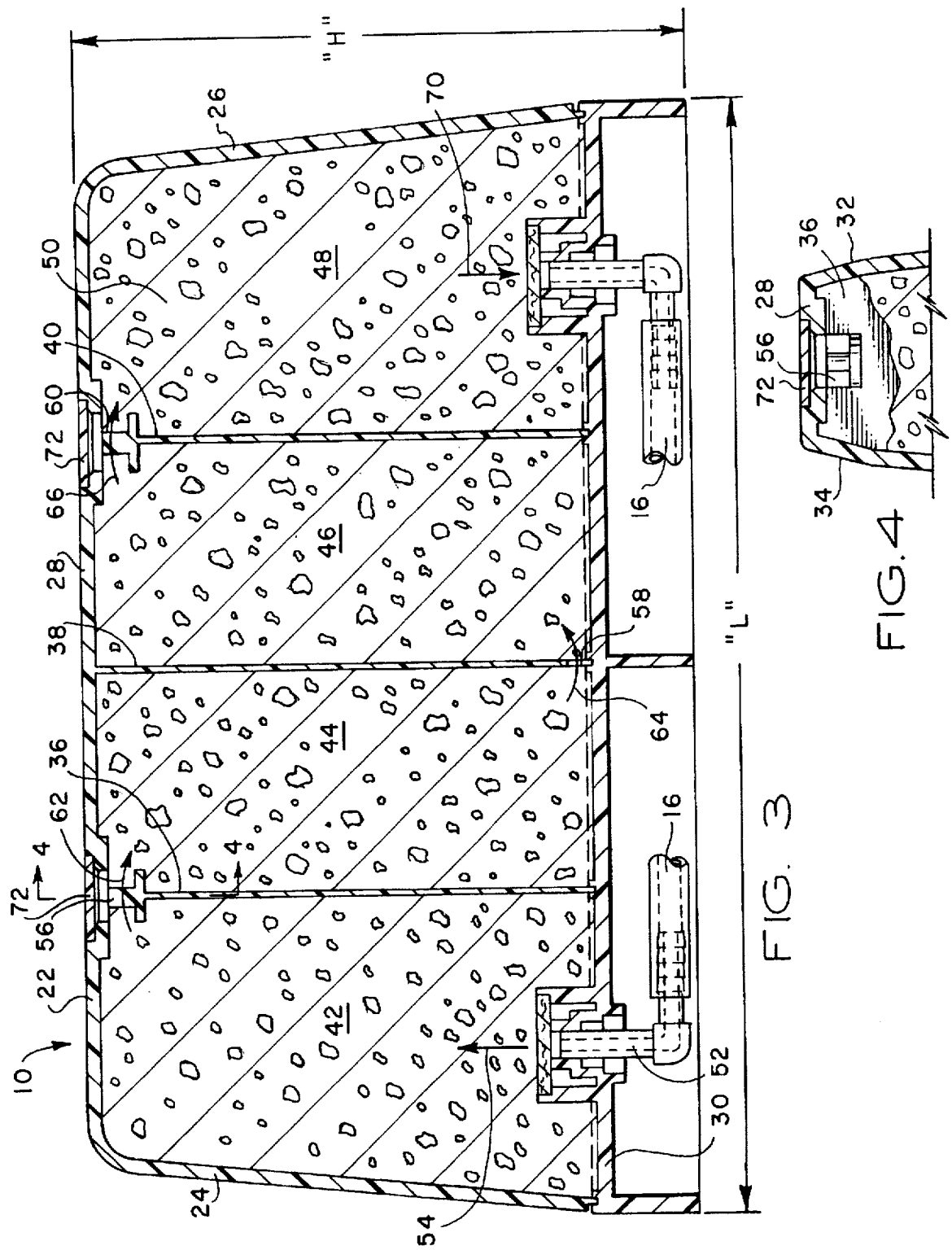

RECTANGULAR BODY WATER PURIFICATION DEVICE

TECHNICAL FIELD

This invention relates in general to water filters, and in particular to a filter that has chambers in a rectangular body containing filtration materials.

BACKGROUND ART

Many households use water filters to remove water impurities from water. Typically these filters connect to a kitchen sink faucet. One type of filtration material comprises activated granulated charcoal. Charcoal removes organic materials and various solids. Another type of filtration material employed is a metallic particulate. The metal particles remove inorganic materials through an ionic exchange.

Dual chamber water filters are disclosed in my prior Pat. Nos. 5,340,478 and 5,041,219, the disclosures of which are incorporated herein by reference. While these prior filters are quite effective in their desired functions, it has been found that the housings employed in such filters occupy substantial counter space in the typical home-owner's kitchen. Space is typically available, however, in the normally unused space between a kitchen sink faucet and the splashboard behind the faucet in conventional sink installations. Thus, a need presently exists for a filter that obtains the advantages of the prior filter designs yet is configured for placement between the typical kitchen sink faucet and splashboard.

SUMMARY OF THE INVENTION

The present invention provides a rectangular body water filter adapted for placement between a kitchen sink faucet and splashboard.

BRIEF DESCRIPTION OF THE DRAWINGS

A more complete understanding of the invention and its advantages will be apparent from the Detailed Description taken in conjunction with the accompanying Drawings, in which:

FIG. 3 is a partially broken away side view of the liquid filter; and

FIG. 4 is a partial sectional view taken along lines 4—4 of FIG. 3.

DETAILED DESCRIPTION OF THE PREFERRED EMBODIMENTS

Figure 1:
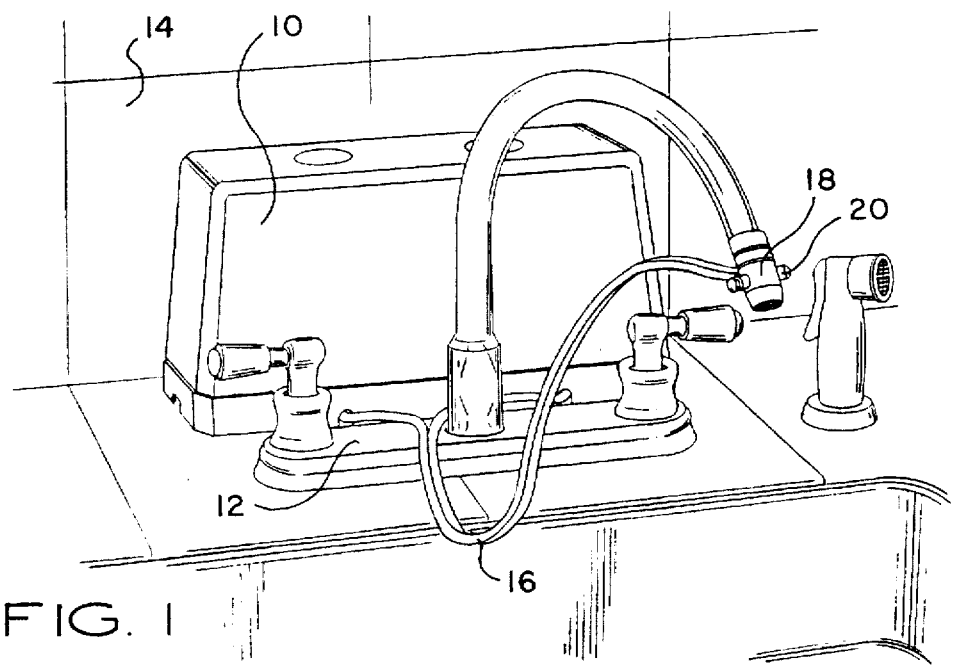
FIG. 1 is a perspective view of a liquid filter constructed in accordance with the present invention in its preferred environment.

Referring to FIGS. 1-4, where like numerals indicate like and corresponding elements, a liquid filter 10 is placed in the heretofore "wasted" space between a kitchen sink faucet 12 and a splashboard 14. In conventional fashion, filter 10 includes conduits 16 extending to a diverter valve 18. In use, diverter valve 18 has a selector 20 that, in one position, allows water to flow through liquid filter 10 for providing filtered water for, for example, drinking, and an alternate position that bypasses the filter for example, providing cleaning water.

Figure 2:
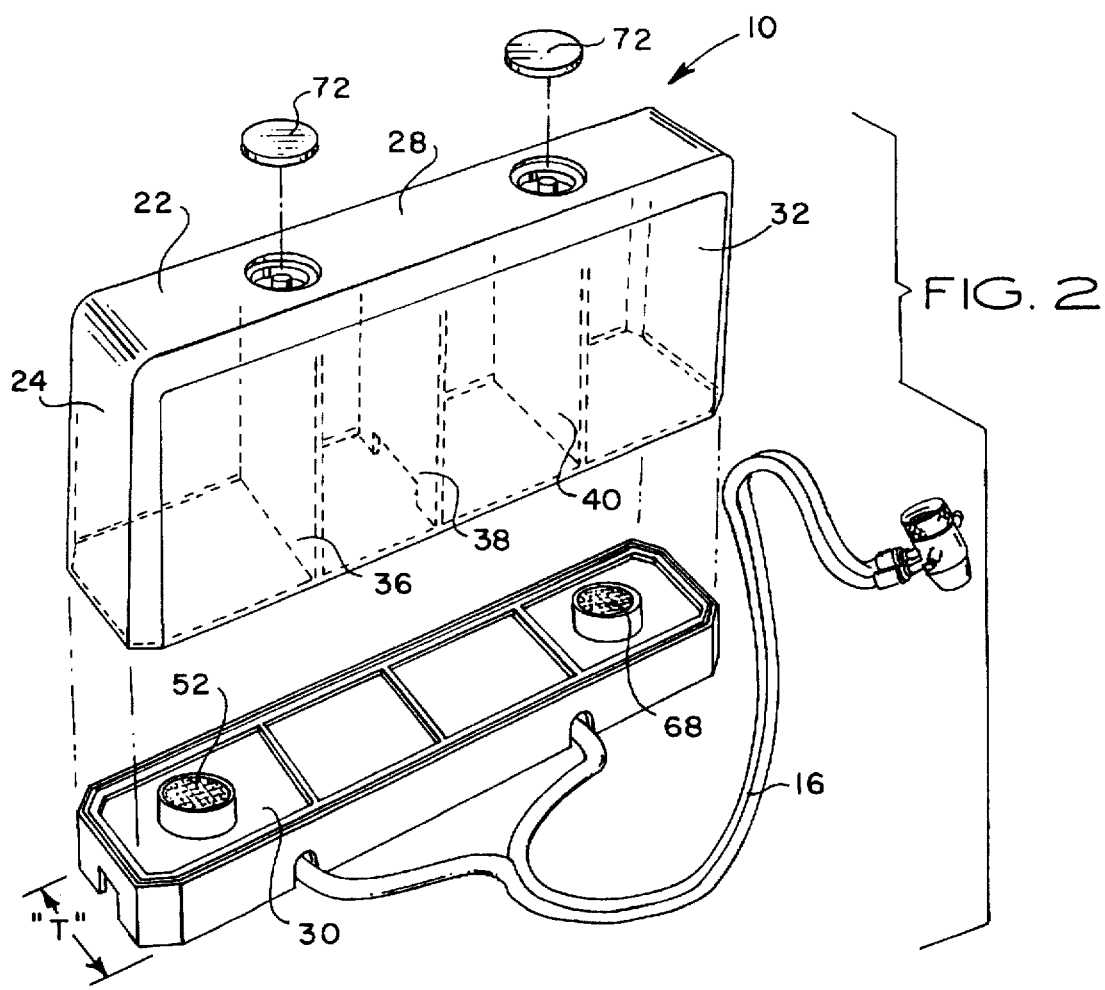
FIG. 2 is an exploded perspective view of the filter of FIG. 1.

As best shown in FIGS. 2-4, liquid filter 10 includes a housing 22 in the form of an elongated, substantially rectangular, body having two end walls 24, 26, top and bottom walls 28, 30, and two side walls, 32, 34. The body has a length dimension "L", a height dimension "H", and a thickness dimension "T".

Three vertical partitions 36, 38, 40 are located in the housing 22 parallel to the end walls 24, 26 and transversely to the length dimension "L". Partitions 36, 38, 40 divide housing 22 into four side-by-side linear chambers 42, 44, 46, 48 having bottoms formed by portion of bottom wall 30. The chambers 42, 44, 46, 48 include two end chambers 42, 48 each defined by an opposing end wall 24, 26 and a partition 36, 40. Two inner chambers 44, 46 are each defined by two opposing partitions 36, 38, 40.

Filtration particulate 50 is located in the chambers 42, 44, 46, 48. Particulate 50 may be any type of filtration media, including but not limited to activated charcoal, metallic particulate, other media, or combinations thereof Particulate 50 may be homogeneous throughout the unit or divided into separate chambers as in prior devices. Inlet means 52 is located in the bottom of one of the end chambers, chamber 42. Inlet means 52 permits liquid to flow into liquid chamber 42 as illustrated by the arrow 54. Port means 56, 58, 60 are located in the partitions 36, 38, 40 for causing liquid flowing through the chambers to pass between adjacent chambers, as illustrated by arrows 62, 64, 66. Outlet means 68 is located in the bottom of the other end chamber 48, to permit liquid to exit filter 10, as shown by arrow 70. Top plugs 72 are provided to seal the top of port means 56 and 60.

A key feature of the invention is that housing 12 has a thickness dimension T of about two inches to permit placement of the filter 10 between a sink faucet and a splashboard as best shown in FIG. 1. Similarly, a length dimension L of about 10 inches has been found to be optimal because it permits the filter to be located substantially behind the entire length of the sink faucet, again as shown in FIG. 1. In one example of the invention, a filter 10 had a length dimension of 9.25 inches at the bottom tapering to 8.75 inches at the top. The taper is ornamental, and has no function. The dimension T of the example was 2.25 inches at the bottom tapering to 1.75 inches at the top. Again, the taper is ornamental and has no function. The dimension H of the example was 5.5 inches, providing a filter housing having a total filtration particulate capacity of about 1 quart.

In operation, liquid filter 10 provides a thin, compact design that allows positioning between the back of a sink faucet and the splashboard wall for the ultimate in convenience and space-saving placement. The directional vertical flow through the liquid filter allows fluid to move from one end to the other without horizontal channeling. The flow design also creates extended media-to-fluid contact for enhanced filtration. Prior designs having an elongated, horizontal body were ineffective due to horizontal channeling, where water follows the path of least resistance and flows on top of media compacted in the bottom of the housing, rather than through the media. The multiple chambers allow a variety of media to be used, separated if desired according to function and purpose. Alternatively, a homogenous media may be used, relying on the multiple chambers to prevent channeling as discussed above.

Whereas, the present invention has been described with respect to specific embodiments thereof, it will be understood that various changes and modifications will be suggested to one skilled in the art, and it is intended to encompass such changes and modifications as fall within the scope of the appended claims.

I claim:

1. A liquid filter, comprising in combination:

a housing in the form of an elongated, substantially rectangular, body having two end walls, top and bottom walls, and two side walls, and the body having length, height and thickness dimensions;

three vertical partitions located in the housing parallel to the end walls and transversely to the length dimension, dividing the housing into four side-by-side linear chambers having bottoms, the chambers including two end chambers each defined by an opposing end wall and a partition and two inner chambers each defined by two opposing partitions;

filtration particulate located in the chambers;

inlet means located in the bottom of one of the end chambers;

port means located in the partitions for causing liquid flowing through the chambers to pass between adjacent chambers;

outlet means located in the bottom of the other end chamber;

with a thickness dimension of about two inches to permit placement of the filter between a sink faucet and a splashboard; and with a length dimension of about ten inches, such that the filter is located substantially behind the entire length of the sink faucet.

\* \* \* \* \*